United States Patent
Aronoff et al.

(10) Patent No.: US 10,154,165 B2
(45) Date of Patent: Dec. 11, 2018

(54) MULTIPLE PAYLOAD PANTOGRAPHS

(71) Applicant: Hewlett-Packard Development Company, L.P., Houston, TX (US)

(72) Inventors: Jason S Aronoff, Fort Collins, CO (US); Steven J Simske, Fort Collins, CO (US); Matthew D Gaubatz, Seattle, WA (US); Robert Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/512,038

(22) PCT Filed: Sep. 19, 2014

(86) PCT No.: PCT/US2014/056500
§ 371 (c)(1),
(2) Date: Mar. 16, 2017

(87) PCT Pub. No.: WO2016/043768
PCT Pub. Date: Mar. 24, 2016

(65) Prior Publication Data
US 2017/0274693 A1    Sep. 28, 2017

(51) Int. Cl.
*H04N 1/00* (2006.01)
*H04N 1/32* (2006.01)
(Continued)

(52) U.S. Cl.
CPC ............ *H04N 1/0087* (2013.01); *B41M 3/14* (2013.01); *B41M 3/146* (2013.01); *G06K 9/18* (2013.01);
(Continued)

(58) Field of Classification Search
None
See application file for complete search history.

(56) References Cited

U.S. PATENT DOCUMENTS

| | | |
|---|---|---|
| 5,915,044 A | 6/1999 | Gardos et al. |
| 6,209,923 B1 | 4/2001 | Thaxton |

(Continued)

FOREIGN PATENT DOCUMENTS

| | | |
|---|---|---|
| CN | 1626359 | 6/2005 |
| CN | 101340504 | 1/2009 |

(Continued)

OTHER PUBLICATIONS

"Improved Void Pantograph Anti-copy Performance with Authenticable Verification Grid Available Now", Sep. 30, 2010.

*Primary Examiner* — Scott A Rogers
(74) *Attorney, Agent, or Firm* — HP Inc. Patent Department

(57) ABSTRACT

Example implementations relate to multiple payload pantograph. Some examples may include a first pattern generation engine to generate a first pattern. The first pattern may be a data-bearing pattern encoding a first payload. Additionally, some examples may include a second pattern generation engine to generate a second pattern, the second pattern (by itself or in combination with the first pattern) may represent a second payload. The second payload may be camouflaged by a combination of the first pattern and the second pattern. Some examples may also include a pantograph generation engine to generate a multiple payload pantograph including the first pattern and the second pattern. The multiple payload pantograph may include the first pattern in one of the pantograph background or the pantograph foreground.

14 Claims, 6 Drawing Sheets

(51) Int. Cl.
*B41M 3/14* (2006.01)
*G06K 15/02* (2006.01)
*G06K 15/00* (2006.01)
*G06K 9/18* (2006.01)

(52) U.S. Cl.
CPC ....... *G06K 15/189* (2013.01); *G06K 15/4095* (2013.01); *H04N 1/00867* (2013.01); *H04N 1/3232* (2013.01); *H04N 1/32208* (2013.01); *H04N 1/32219* (2013.01); *H04N 1/32256* (2013.01); *H04N 1/32293* (2013.01); *H04N 1/32299* (2013.01); *H04N 1/32304* (2013.01)

(56) References Cited

U.S. PATENT DOCUMENTS

| | | | | |
|---|---|---|---|---|
| 7,697,170 | B2* | 4/2010 | Otake | G03G 21/04 358/2.1 |
| 7,869,090 | B2 | 1/2011 | Wang et al. | |
| 7,920,817 | B2* | 4/2011 | Oomura | H04N 1/00883 283/902 |
| 8,339,679 | B2* | 12/2012 | Tsujii | H04N 1/0044 358/3.24 |
| 8,355,180 | B2 | 1/2013 | Wu et al. | |
| 8,405,882 | B2* | 3/2013 | Cole | H04N 1/00883 358/1.18 |
| 8,508,792 | B2* | 8/2013 | Arakawa | H04N 1/00856 283/902 |
| 8,681,384 | B2* | 3/2014 | Fujii | G03G 21/043 283/902 |
| 8,891,132 | B2* | 11/2014 | Nakano | G06K 15/189 358/2.1 |
| 2006/0087672 | A1 | 4/2006 | Fujii | |
| 2006/0274939 | A1 | 12/2006 | Yamada | |
| 2009/0244641 | A1 | 10/2009 | Wu | |
| 2010/0046036 | A1 | 2/2010 | Tsujii | |
| 2010/0123912 | A1 | 5/2010 | Wang et al. | |
| 2010/0157378 | A1* | 6/2010 | Cole | G03G 21/043 358/3.28 |
| 2010/0239342 | A1 | 9/2010 | Oomura | |
| 2010/0314450 | A1 | 12/2010 | Powell | |
| 2011/0085209 | A1 | 4/2011 | Man | |
| 2013/0251191 | A1 | 9/2013 | Simske | |

FOREIGN PATENT DOCUMENTS

| | | |
|---|---|---|
| CN | 102616043 | 8/2012 |
| WO | WO-2010098760 | 2/2010 |
| WO | WO-2012054036 | 4/2012 |
| WO | WO-2014120138 | 8/2014 |

* cited by examiner

MULTIPLE PAYLOAD PANTOGRAPHS

BACKGROUND

Pantographs may be used to create copy-evident backgrounds for a variety of security documents. Some prominent examples of pantographs are those that are used as backgrounds for checks, which, for example, rosy have the words "VOID" or "COPY" as hidden elements on the check. When reproduced, the hidden elements (e.g., the word "VOID") appear on the reproduced document. In general, pantograph approaches may be used to hide in plain sight information that can be read and acted upon.

BRIEF DESCRIPTION OF THE DRAWINGS

The following detailed description references the drawings, wherein.

DETAILED DESCRIPTION

Figure 1:
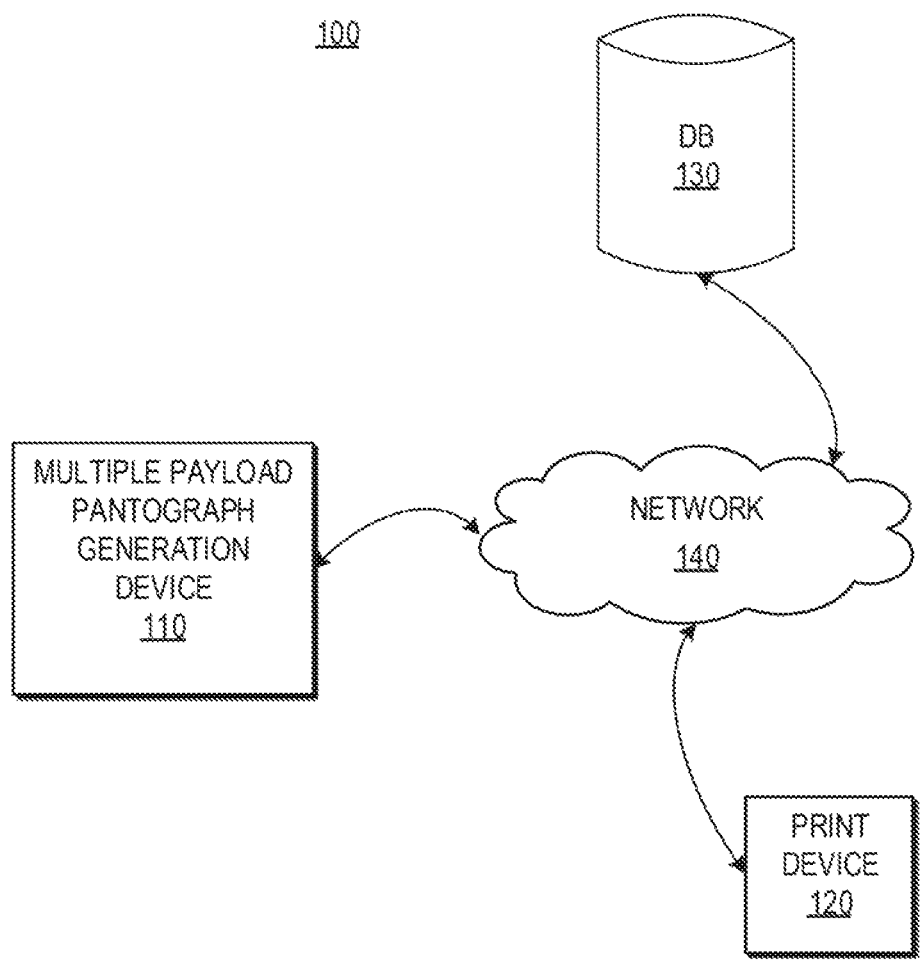
FIG. 1 is a block diagram of an example system for generating multiple payload pantographs consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, a traditional pantograph may hide a single payload (e.g., the words "VOID" or "COPY") which may be difficult for a human observer to visually discern until the pantograph is reproduced (e.g., copied, scanned, photographed, and the like). Some pantographs may include a pantograph foreground and a pantograph background. As used herein, the phrase "pantograph foreground" refers to the portion of the pantograph that is covert or semi-covert after being printed on a print medium, but that becomes patent or overt after the printed pantograph is reproduced (e.g., "VOID" or "COPY"). Additionally, as used herein, the phrase "pantograph background" refers to the portion of the pantograph that is covert or semi-covert after being printed on a print medium, and that is all or partly lost when the printed pantograph is reproduced. In some examples, the pantograph foreground and the pantograph background may be independent from one another, meaning that the pantograph foreground may be generated separately from the pantograph background.

In one simple form, the traditional pantograph may be constructed of two types of dots of varying size, typically referred to as the big-dot-little-dot approach. In this approach, the pantograph foreground may be comprised of one dot size and the pantograph background of the other, and the dots are placed randomly so that the pantograph has a minimally visible payload when printed and distinctly visible payload when reproduced. This reproduction effect occurs by playing off the optical resolution of scanners/copiers and the like inasmuch as the larger dots are acquired within diminution by the scanner elements but the smaller dots are all or partly lost in the scan/copy process due to their lower effective resolution. The result is that the "little dots" may not survive the reproduction process and the "big dots" may become larger and even overlap each other, revealing the single payload as shapes, text, and the like.

When generating a traditional pantograph, there may be a fundamental minimum area that is required so that the pantograph effect will be noticeable and effective. Additionally, the single payload typically cannot contain much information due to the amount of space needed on the printed document to render the pantograph. Accordingly, to strengthen the anti-copy feature of a pantograph, a pantograph should be able to include more than one human differentiable payload while maintaining the pantograph effect. Examples disclosed herein may provide pantographs that conceal and/or encode at least a first payload and a second payload ("a multiple payload pantograph"). To this end, example implementations disclosed herein may provide a multiple payload pantograph by generating a first data-bearing pattern encoding a first payload, generating a second pattern that by itself or in combination with the first pattern represents a second payload, and generating a multiple payload pantograph including the first pattern and the second pattern, where the multiple payload pantograph includes the first pattern in one of the pantograph background or the pantograph foreground. For example, one or both of the foreground/background patterns may be encoded with a second, independently readable/decodable encoding (e.g., a second payload that isn't decoded by reproduction). In this approach, rather than employing random dot placement, symbols (e.g., dots) are positioned so that the symbols themselves are data-bearing (e.g., the symbols are positioned to comprise grid codes, stegatones, and the like). Additionally, the symbols may be readily decodable from the printed pantograph, or may only become activated for decoding after being reproduced. As used herein, a grid code may be considered to be a data-bearing array of dots that encode information by tiny perturbations in position, and a stegatone may be considered to be a data-bearing halftone image that utilizes shifted dot clusters to, encode information into a portion of an image.

Referring now to the drawings, FIG. 1 is a block diagram of an example system 100 for generating multiple payload pantographs consistent with disclosed implementations. System 100 may be implemented in a number of different configurations without departing from the scope of the disclosed examples. In the example shown in FIG. 1, system 100 may include a multiple payload pantograph generation device 110, a print device 120, a database 130, and a network 140 for connecting multiple payload pantograph generation device 110 with database 120 and/or print device 130.

Multiple payload pantograph generation device 110 (hereinafter "pantograph generation device 110") may be a computing system that performs various functions consistent with disclosed examples, such as generating pantographs including first coded information and second coded information. For example, pantograph generation device 110 may be a desktop computer, a laptop computer, a tablet computing device, a mobile phone, a server, and/or any other type of computing device. In some examples, pantograph generation device 110 may generate a first data-bearing pattern encoding a first payload, a second pattern (which may or may not be data-bearing) that represents a second payload either by itself or in combination with the first data-bearing pattern, and a pantograph including the first pattern and the second pattern. As used herein, a "data-bearing pattern" is a pattern that has been intentionally encoded with data. The first pattern may be encoded (e.g., visibly encoded) in one of the pantograph background or the pantograph foreground, and the second payload may be camouflaged by the combination of the first pattern and the second pattern. For example, the first payload may be the data that is encoded by the first pattern, and the second payload may be the pantograph foreground. In other words, the second payload may be semi-covert when the first pattern and the second pattern are combined. Examples of pantograph generation device 110 and certain functions that may be performed by device 110 are described in greater detail below with respect to, for example, FIGS. 2-5B.

Print device 120 may be any device that prints content onto a physical medium. For example, print device 120 may be a PWA printer, an inkjet printer, a laser printer, a UV printer, a solvent printer, a plotter, and/or any other type of device that can produce content (e.g. images, text, etc.) on a print medium. Print device 120 may receive or otherwise access multiple payload pantographs, such as a multiple payload pantograph generated by pantograph generation device 110, and may print the multiple payload pantograph on a print medium, such as paper. For example, print device 120 may include a processor, and may access, via the processor, a digital version of the multiple payload pantograph. The multiple payload pantograph may include a first pattern and a second pattern, where the first pattern is a first data-bearing pattern encoding a first payload and the second pattern, when combined with the first pattern, camouflages a second payload. In some examples, the first pattern may itself be the second payload or the second pattern may itself be the second payload. Additionally, in some examples, the first pattern may be positioned in one of a pantograph foreground region and a pantograph background region. An example of a printed pantograph is discussed in greater detail below with respect to, for example, FIG. 5A.

Database 130 may be any type of storage system configuration that facilitates the storage of data. For example, database 130 may facilitate the locating, accessing, and retrieving of data (e.g., SaaS, SQL, Access, etc. databases, XML files, etc.). Database 130 can be populated by a number of methods. For example, pantograph generation device 110 may populate database 130 with database entries generated by pantograph generation device 110, and store the database entries in database 130. As another example, pantograph generation device 110 may populate database 130 by receiving a set of database entries from another component, a wireless network operator, and/or a user of print device 120, and storing the database entries in database 130. The database entries can contain a plurality of fields, which may include information related to multiple payload pantograph generation, such as images, encoding specifications, payloads, and/or the like. While in the example shown in FIG. 1 database 130 is a single component external to components 110 and 120, database 130 may comprise separate databases and/or may be part of devices 110, 120, and/or another device. In some implementations, database 130 may be managed by components of devices 110 and/or 120 that are capable of accessing, creating, controlling and/or otherwise managing data remotely through network 140.

Network 140 may be any type of network that facilitates communication between remote components, such as pantograph generation device 110 and print device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one pantograph generation device 110, print device 120, database 130, and network 140, system 100 may include any number of components 110, 120, 130, and 140, as well as other components not depicted in FIG. 1. System 100 may also omit any of components 110, 120, 130, and 140. For example, pantograph generation device 110 and print device 120 may be directly connected instead of being connected via network 140. As another example, pantograph generation device 110 and print device 120 may combined to be a single device.

Figure 2:
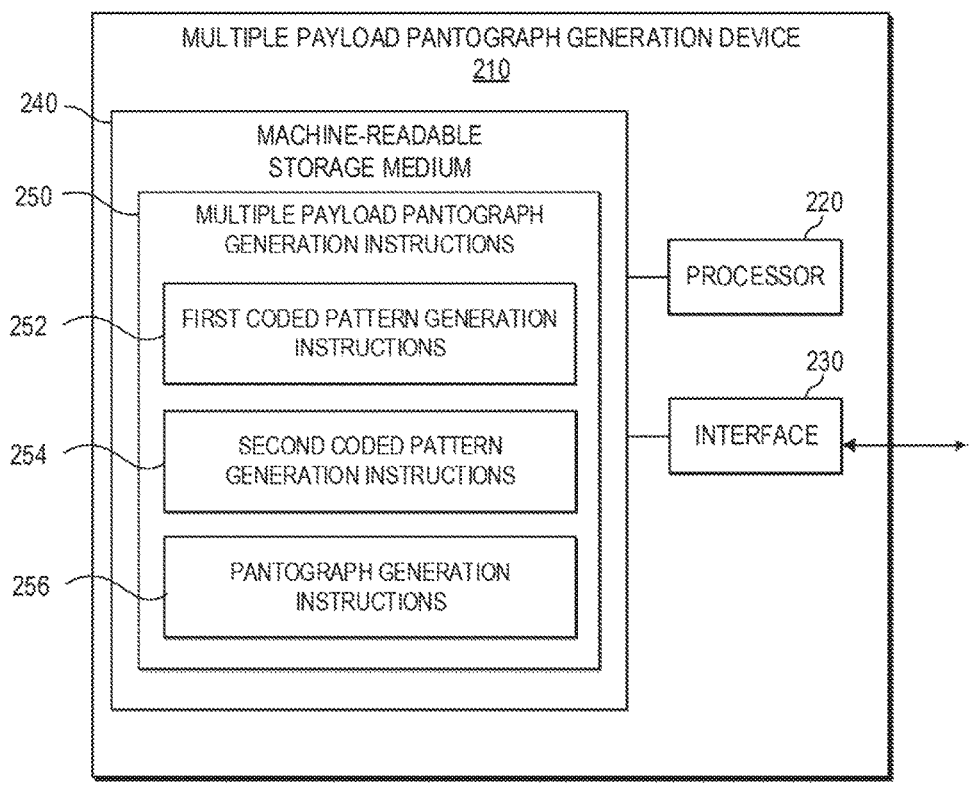
FIG. 2 is a block diagram of an example multiple payload pantograph generation device consistent with disclosed implementations.

FIG. 2 is a block diagram of an example multiple payload pantograph generation device 210 consistent with disclosed implementations. In certain aspects, multiple payload pantograph generation device 210 ("hereinafter pantograph generation device 210") may correspond to multiple payload pantograph generation device 110 of FIG. 1. Pantograph generation device 210 may be implemented in various ways. For example, pantograph generation device 210 may be a special purpose computer, a server, a mainframe computer, a computing device executing instructions that receive and process information and provide responses, and/or any other type of computing device. In the example shown in FIG. 2, pantograph generation device 210 may include a processor 220, an interlace 230, and a machine-readable storage medium 240.

Processor 220 may be at least one processing unit (CPU), microprocessor, and/or another hardware device to execute instructions to perform operations. For example, processor 220 may fetch, decode, and execute multiple payload pantograph generation instructions 250 (e.g., instructions 252, 254, and/or 256) stored in machine-readable storage medium 240 to perform operations related to disclosed examples.

Interface device 230 may be any device that facilitates the transfer of information between device 210 and other components, such as print device 120 and/or database 130. In some examples, interface device 230 may include a network interface device that allows device 210 to receive and send data to and from network 140. For example, interface device 230 may retrieve and process data related to generating multiple payload pantographs from database 130 via network 140.

Machine-readable storage medium 240 may be any electronic, magnetic, optical, or other physical storage device that stores executable instructions. Thus, machine-readable storage medium 240 may be, for example, memory, a storage drive, an optical disc, and/or the like. In some implementations, machine-readable storage medium 240 may non-transitory, such as a non-transitory computer-readable storage medium, where the term "non-transitory" does not encompass transitory propagating signals. Machine-readable storage medium 240 may be encoded with instructions that, when executed by processor 220, perform operations consistent with disclosed implementations. For example, machine-readable storage medium 240 may include instructions that perform operations that may generate a multiple payload pantograph encoding or otherwise including a first payload and a second payload, where the first payload is encoded in a data-bearing pattern and the second payload is camouflaged by a second pattern combined with the data-bearing pattern. In the example shown in FIG. 2, machine-readable storage medium 240 may include first coded pattern generation instructions 252, second coded pattern generation instructions 254, and pantograph generation instructions 256.

First coded pattern generation instructions 252 may function to generate a first pattern. The first pattern may be a data-bearing pattern encoding a first payload. For example, when first coded pattern generation instructions 252 are executed by processor 230, first coded pattern generation instructions 252 may cause processor 220 of pantograph generation device 210, and/or another processor to determine a payload, determine an encoding scheme, determine a pantograph foreground region and/or a pantograph background region, and generate a first pattern based on the payload, the encoding scheme, and/or the region. Examples of the steps involved in generating a first pattern are described in further detail below with respect to, for example, FIGS. 4-5B.

Second coded pattern generation instructions 254 may function to generate a second pattern. The second pattern, by itself or in combination with the first pattern, may represent a second payload, which may be camouflaged by a combination of the first pattern and the second pattern. For example, the second payload may be the text, shape, symbol, and the like that makes up the pantograph foreground. For example, when second coded pattern generation instructions 254 are executed by processor 220, second coded pattern generation instructions 254 may cause processor 220 of pantograph generation device 210, and/or another processor to determine a region (e.g., a pantograph foreground region or a pantograph background region) where the second pattern will be placed and generate a second pattern based on the determined region. In some implementations, the second pattern may be a data-bearing pattern encoding a third payload. Thus, the second pattern may both represent a second payload (e.g., constitute a pantograph foreground) and encode a third payload (encode data). Examples of the steps involved in generating a second pattern are described in further detail below with respect to, for example, FIGS. 4-6B.

Pantograph generation instructions 256 may function to generate a pantograph including the first pattern and the second pattern. The multiple payload pantograph may include the first pattern (e.g., the data-bearing pattern) in one of the pantograph background or the pantograph foreground. For example, when pantograph generation instructions 256 are executed by processor 220, pantograph generation instructions 256 may cause processor 220 of pantograph generation device 210, and/or another processor to merge the first pattern with the second pattern. The first pattern may represent one of the pantograph foreground region or the pantograph background region, and the second pattern may represent the other of the pantograph foreground region or the pantograph background region. Examples of the steps involved in generating a pantograph including the first pattern and the second pattern are described in further detail below with respect to, for example, FIGS. 4-6B.

Figure 3:
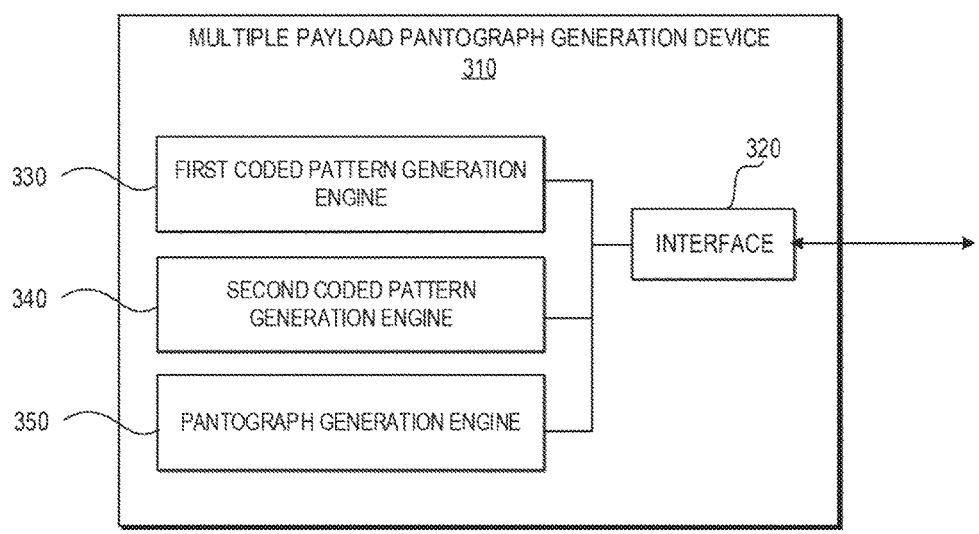
FIG. 3 is a block diagram of an example multiple payload pantograph generation device consistent with disclosed implementations.

FIG. 3 is a block diagram of an example multiple payload pantograph generation device 310 consistent with disclosed implementations. In certain aspects, multiple payload pantograph generation device 310 (hereinafter "pantograph generation device 310") may correspond to multiple payload pantograph generation device 110 of FIG. 1 and/or multiple payload pantograph generation device 210 of FIG. 2. Pantograph generation device 310 may be implemented in various ways. For example, pantograph generation device 310 may be a computing system and/or any other suitable component or collection of components that generate a multiple payload pantograph. In the example shown in FIG. 3, pantograph generation device 310 may include an interface device 320, a first coded pattern generation engine 330, a second coded pattern generation engine 340, and a pantograph generation engine 350.

Interface device 320 may be any device that facilitates the transfer of information between pantograph generation device 310 and external components. In some examples, interface device 320 may include a network interface device that allows pantograph generation device 310 to receive and send data to and from a network. For example, interface device 320 may retrieve and process data related to generating first and second patterns from database 130.

Engines 330, 340, and 350 may be electronic circuitry for implementing functionality consistent with disclosed examples. For example, engines 330, 340, and 350 may represent combinations of hardware devices and instructions to implement functionality consistent with disclosed implementations. For example, the instructions for the engines may be processor-executable instructions stored on a non-transitory machine-readable storage medium and the hardware for the engines may include a processor to execute those instructions. In some examples, the functionality of engines 330, 340, and 350 may correspond to operations performed by pantograph generation device 110 of FIG. 1 and/or pantograph generation device 210 of FIG. 2, such as operations performed when multiple payload pantograph generation instructions 250 are executed by processor 220. In FIG. 3, first coded pattern generation engine 330 may represent a combination of hardware and instructions that performs operations similar to those performed when processor 220 executes first coded pattern generation instructions 252. Similarly, second coded pattern generation engine 340 may represent a combination of hardware and instructions that performs operations similar to those performed when processor 220 executes second coded pattern generation instructions 254, and pantograph generation engine 350 may represent a combination of hardware and instructions that performs operations similar to those performed when processor 220 executes pantograph generation instructions 256.

Figure 4:
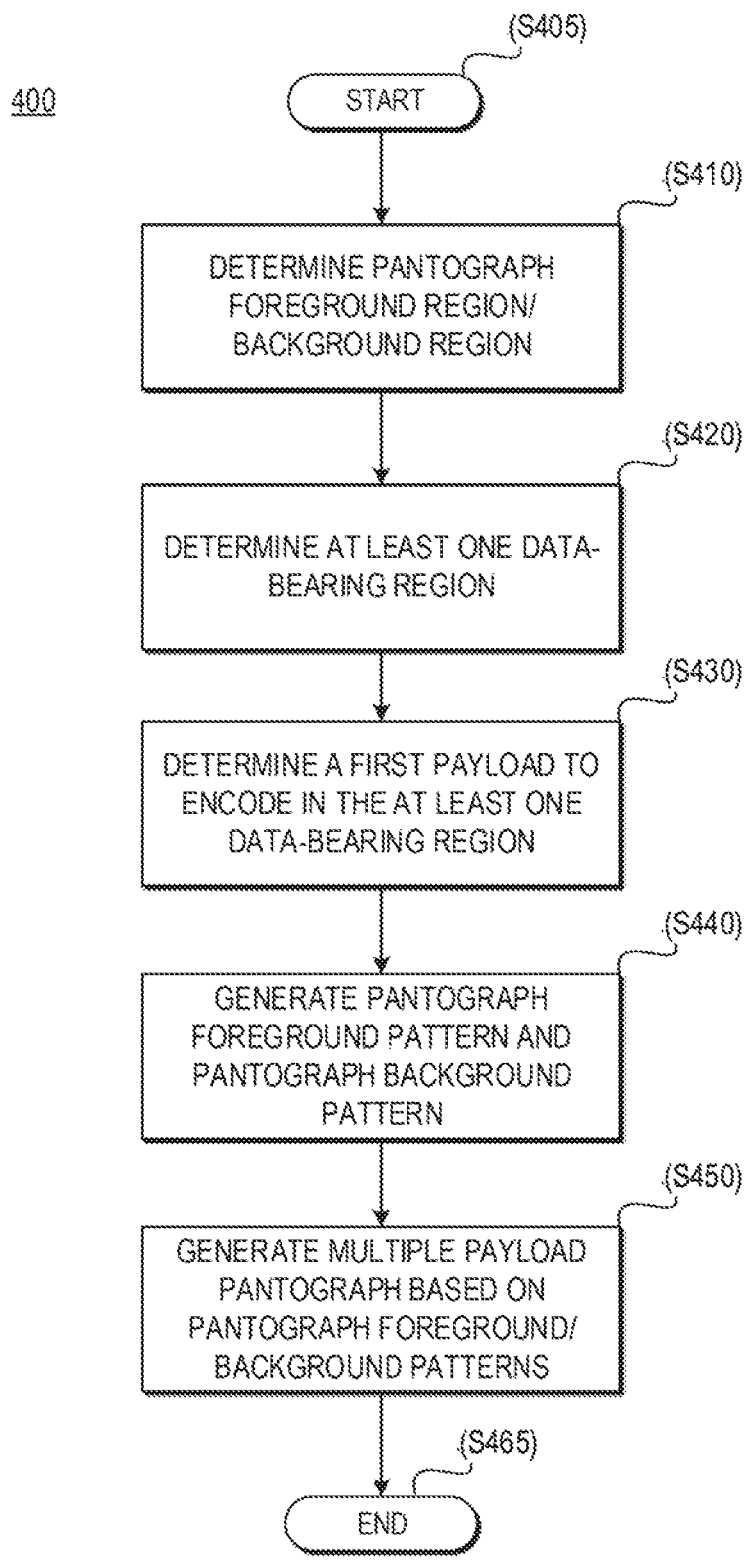
FIG. 4 is a flow chart of an example process for generating multiple payload pantographs consistent with disclosed implementations.

FIG. 4 is a flow chart of an example process 400 for generating multiple payload pantographs consistent with disclosed implementations. Although execution of process 400 is described below with reference to system 100, other suitable systems and/or devices for execution of at least one step of process 400 may be used. For example, processes described below as being performed by system 100 may be performed by pantograph generation device 210, pantograph generation device 310 and/or any other suitable device or system. Process 400 may be implemented in the form of executable instructions stored on a storage device, such as a machine-readable storage medium, and/or in the form of electronic circuitry.

Process 400 may start (step S405) by determining a pantograph foreground region and/or a pantograph background region (step S410). For example, the pantograph foreground and/or the pantograph background regions may be pre-determined. As another example, device 110 of system 100 may query or otherwise access database 130 to determine an image from which the pantograph foreground region and/or the pantograph background region will be generated. The image may be any digitized image, including at least one of text, shapes, glyphs, photographs, and/or any other information that can be read and interpreted by system 100. The image may be filtered using at least one filter to designate at least one area for the pantograph foreground and the pantograph background based upon the particular attribute(s) associated with the filter(s). For example, if an edge filter is selected to filter the image, the filtering process may identify edge pixels and non-edge pixels. The filtered pixels are then assigned to the pantograph foreground or the pantograph background based, at least in part, on which pixels are suitable for forming the respective regions of the multiple payload pantograph. Such foreground and background pixels may be selected automatically. For example, the higher information areas (e.g., higher edge content or image entropy or image high frequency content) are separated from the lower information areas to make a good pantograph image. In the example involving the edge filter, the edge pixels may be assigned to the pantograph foreground and the non-edge pixels may be assigned to the pantograph background.

Process 400 may also include determining at least one data-bearing region (step S420). For example, device 110 may determine whether to select the pantograph foreground region and/or the pantograph background region as the data-bearing region. The selection of the at least one data-bearing region may be defined by a data-bearing region specification stored in a storage device, such as database 130, and device 110 may query database 130 to determine which one(s) of the regions to encode with data.

Process 400 may also include determining the payload(s) to be encoded in the multiple payload pantograph (step S430). For example, device 110 may determine a first payload to encode in the at least one data-bearing region. In some examples, device 110 of system 100 may query database 130 to determine at least one payload (e.g., the first payload and/or the third payload) to be encoded. The payload may be text, symbols, images, and/or any other suitable payload. For example, if the multiple payload pantograph is to be used on a check, device 110 may query database 130 to determine the value of a particular check and the individual who wrote the check and use those values as first payload and third payload respectively.

Process 400 may also include generating a pantograph foreground pattern and/or a pantograph background pattern (step S440). In some implementations, the pantograph foreground pattern may be generated in the pantograph foreground region and the pantograph background pattern may be generated in the pantograph background region. For example, based on the determination of which region(s) will include a data-bearing pattern, the size and shape of the pantograph foreground and/or background regions, and the payload(s) to be encoded, device 110 of system 100 may generate a first pattern and a second pattern. If device 110 determines that the pantograph foreground region or the pantograph background region should include a data-bearing pattern, the first pattern may be a data-bearing pattern encoding a first payload and the second pattern may represent a second payload, either by itself or in combination with the first pattern. For example, the first payload may encoded in the first pattern and the second payload may be the pantograph foreground (before reproduction, after reproduction, or before and after reproduction). If device 110 determines that the pantograph foreground region and the pantograph background region should both include a data-bearing pattern, the first pattern may be a data-bearing pattern encoding a first payload (e.g., a first data-bearing pattern) and the second pattern may be a data-bearing pattern (e.g., a second data-bearing pattern) that represents both a second payload (either by itself or in combination with the first pattern) and a third payload. For example, the first payload may be encoded in the first pattern, the second payload may be the pantograph foreground, and the third payload may be encoded in the second pattern.

The first pattern and/or the second pattern may have sets of pattern characteristics. In some examples, these characteristics may be modified by reproduction such that a coded version of the first payload, the second payload, and/or a coded version of the third payload are revealed upon reproduction or do not, survive reproduction. For example, the first pattern may include a plurality of symbols having a set of first pattern characteristics (e.g., symbol size, symbol position, symbol color, and the like). Reproducing the multiple payload pantograph may modify at least one of the set of first pattern characteristics to reveal a coded version of the first payload. For example, if a data-bearing pattern is utilized in the pantograph foreground, the data-bearing pattern may be intentionally generated as a size that is too small to be readable from the original print of the multiple payload pantograph. In other words, the first pattern is generated by positioning, sizing, and/or shaping the symbols to precompensate for modifications in the first pattern due to reproduction. Not until after the original multiple payload pantograph has been reproduced (and the symbols made larger by reproduction), will the encoded first payload be readable. Thus, reproducing the multiple payload pantograph modifies at least one of the set of first pattern characteristics such that the first payload does not survive the reproduction. Alternatively, the first data-bearing pattern may be generated at a nominal size for printing such that any dot gain from the printing process is taken into account and the first data-bearing pattern is immediately readable from the original printed multiple payload pantograph. As another example, if a data bearing pattern is utilized in the pantograph background, the payload (e.g., the first payload) may be immediately readable from the original printed multiple payload pantograph, but not after reproduction. In some implementations, the first pattern and/or the second pattern may be a grid code, a stegatone, and the like. In some implementations, the amount of data that can be represented by the first and/or second pattern may be provided explicitly by database 130, or derived from the foreground pantograph region and its associated characteristics and/or the background pantograph region and its associated characteristics.

To generate the first pattern and the second pattern, device 110 may query database 130 to determine encoding specifications for the foreground pantograph region and/or the background pantograph region. Based on these specifications, which themselves may be based on various design considerations and a target printing device, device 110 may generate the first pattern and the second pattern to fill the specified pantograph foreground region. For example, device 110 determines that the pantograph foreground will include a data-beating pattern, device 110 may fill the pantograph foreground region with the first pattern. In some examples, based on the encoding specifications, device 110 may generate the first pattern by sizing, shaping, positioning, and/or coloring a first set of symbols (e.g., dots) to fill the pantograph foreground region and encode the first, payload such that (1) a coded version of the first payload is immediately (and, correctly) decodable and/or will become correctly decodable after reproduction, and (2) the first pattern constitutes the second payload that is camouflaged (e.g., minimally distinguishable based on a visual inspection, covert, and/or semi-covert) when combined with the second pattern and is revealed (e.g., made overt) upon reproduction. Based on the encoding specifications, device 110 may also generate the second pattern by sizing, shaping, positioning, and/or coloring a second set of symbols to fill the pantograph background region in a manner that (1) camouflages or otherwise obscures the first pattern and/or the second payload, and/or (2) will not survive reproduction such that a majority of the second pattern is not visible in a reproduction of the multiple payload pantograph.

As another example, if device 110 determines that the pantograph background will include a data-bearing pattern, device 110 may fill the pantograph background region with the first pattern, and the first pattern may include a first set of symbols that are sized, shaped, positioned, and/or colored based on the encoding specifications such that (1) a coded version of the first payload is immediately (and correctly) decodable and/or will not survive (e.g., be destroyed by) reproduction, and (2) the first pattern camouflages the second pattern. Based on the encoding specifications, device 110 may also generate the second pattern by sizing, shaping, positioning, and/or coloring a second set of symbols to fill the pantograph foreground region in a manner that represents the second payload. For example, the symbols may be sized, shaped, positioned, and/or colored such that the second payload is the second pattern and is revealed upon reproduction.

As yet another example, if device 110 determines that both the pantograph foreground and background will include data-bearing patterns, the pantograph foreground region may be filled with the first pattern, and the first pattern may include a first set of symbols that are sized, shaped, position, and/or colored based on the encoding specifications to fill the pantograph foreground region and encode the first payload such that (1) a coded version of the first payload is immediately (and correctly) decodable and/or will become correctly decodable after reproduction, and (2) the first pattern constitutes the second payload that is camouflaged (e.g., minimally visible, covert, and/or semi-covert) when combined with the second pattern and is revealed (e.g., made overt) upon reproduction. Based on the encoding specifications, device 110 may also generate the second pattern by sizing, shaping, positioning, and/or coloring a second set of symbols to fill the pantograph background region and encode a third payload such that (1) a coded version of the third payload is immediately (and correctly) decodable and/or will not survive (e.g., be destroyed by) reproduction, and (2) the second pattern camouflages the first pattern.

Process 400 may also include generating a multiple payload pantograph based on the pantograph foreground pattern and the pantograph background pattern (step S450). In some examples, device 110 of system 100 may generate the multiple payload pantograph by merging the pantograph foreground pattern and the pantograph background pattern. The pantograph foreground pattern and the pantograph background pattern may be merged to generate a multiple payload pantograph such that the combination of the pantograph foreground pattern and the pantograph background pattern resemble the regions of the image identified in step S410. In some examples, device 110 may generate the multiple payload pantograph by printing the multiple payload pantograph on a print medium. For example, device 110 may transmit the multiple payload pantograph to print device 120 via network 140, and print device 120 may dispense printing fluid on the print medium to print the multiple payload pantograph. After the multiple payload pantograph has been generated, process 400 may end (step S465).

Figure 5A:
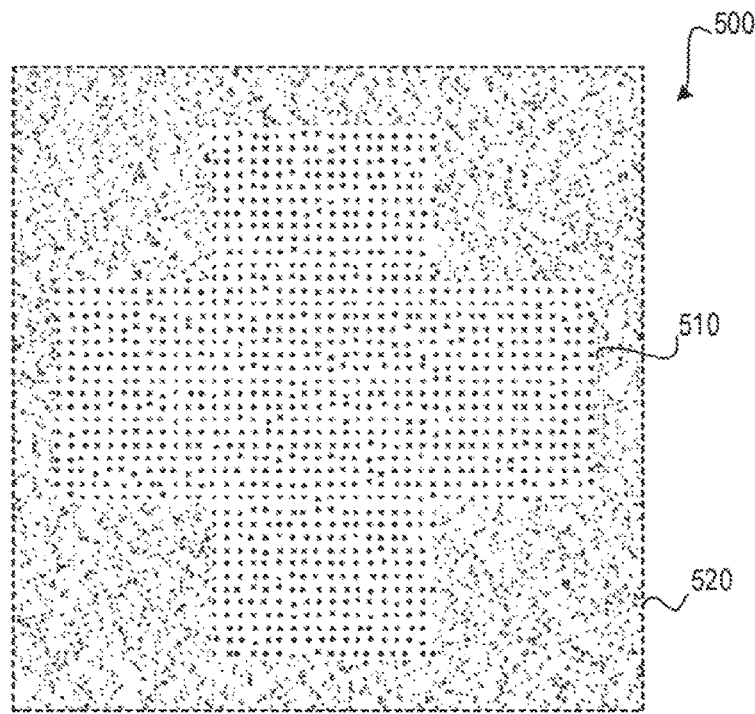
FIG. 5A is an example of a multiple payload pantograph before reproduction consistent with disclosed implementations.

FIG. 5A is an example of a multiple payload pantograph 500 before reproduction consistent with disclosed implementations. In the example shown in FIG. 5A, multiple payload pantograph 500 (hereinafter "pantograph 500") includes a pantograph foreground 510 and a pantograph background 520. Pantograph foreground 510 in this example is a cross-shape, and includes a pattern (e.g., a first pattern) that is a data-bearing pattern encoding a first payload (e.g., data) and representing a second payload (e.g., the cross-shape). In this example, the data-bearing pattern is illustrated as a grid code, but implementations consistent with disclosed examples may include any suitable type of data-bearing pattern in the pantograph foreground and/or the pantograph background. Furthermore, pantograph foregrounds consistent with disclosed examples (including test pantographs) may be any suitable shape or size (e.g., readily communicated and recognizable shapes), and may be located at any position within the multiple payload pantograph. As shown in the example illustrated in FIG. 5, pantograph background 520 includes a pattern (e.g., a second pattern) that is a non-data-bearing pattern (e.g., a set of arbitrarily placed dots having varied densities so as to camouflage, disguise, or otherwise obscure the pantograph foreground). While in this example, pantograph background 520 includes a set of arbitrarily placed dots, implementations consistent with disclosed examples may include any types of symbols, and the symbols may be arbitrarily placed, purposely placed, and/or encode an additional payload. As shown in FIG. 5A, the symbols of pantograph foreground 510 are generally larger than the symbols of pantograph background 520.

Figure 5B:
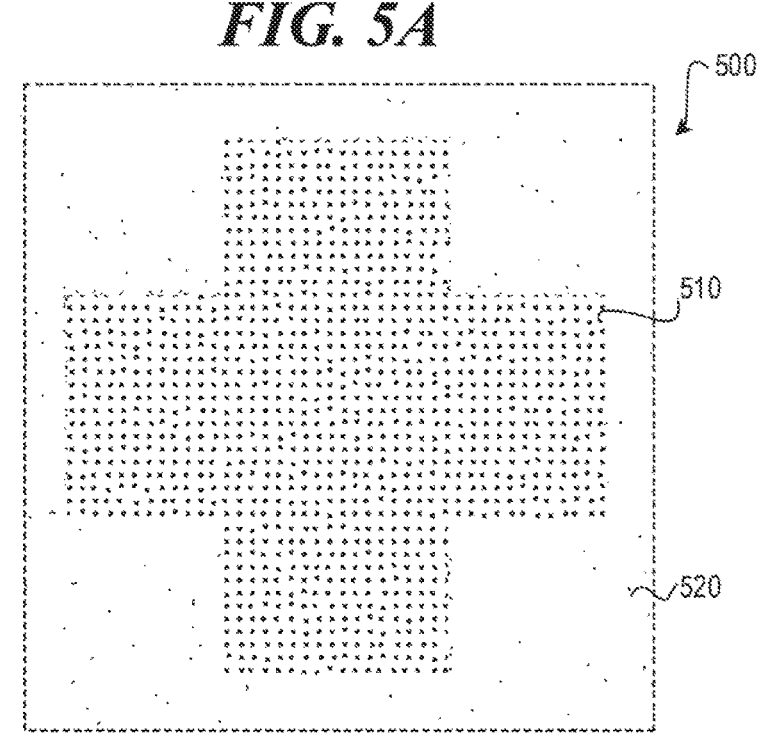
FIG. 5B is an example of the multiple payload pantograph of FIG. 5A after reproduction consistent with disclosed implementations.

FIG. 5B is an example of the multiple payload pantograph 500 of FIG. 5A after reproduction consistent with disclosed implementations. As discussed above, the symbols of pantograph foreground 510 are larger than the symbols of pantograph background 520. Accordingly, upon reproduction, many (e.g., a majority) of the smaller symbols of pantograph background 520 diminish and/or disappear and the larger symbols of pantograph foreground 510 become visually distinct. In other words, pantograph foreground 510 may include symbols that dilate upon reproduction and pantograph background 520 may include symbols that erode upon reproduction. Note that in FIGS. 5A and 5B, the sets of symbol characteristics of pantograph foreground 510 and/or pantograph background 520 are simplified (e.g., intentionally not optimized) such that pantograph foreground 510 is easily discernable from pantograph background 520. This simplification is done for illustrative purposes only, and implementations consistent with disclosed examples may more deftly camouflage the pantograph foreground such that the pantograph foreground is covert or minimally overt (e.g., over to a trained observer) after being printed.

Figure 6A:
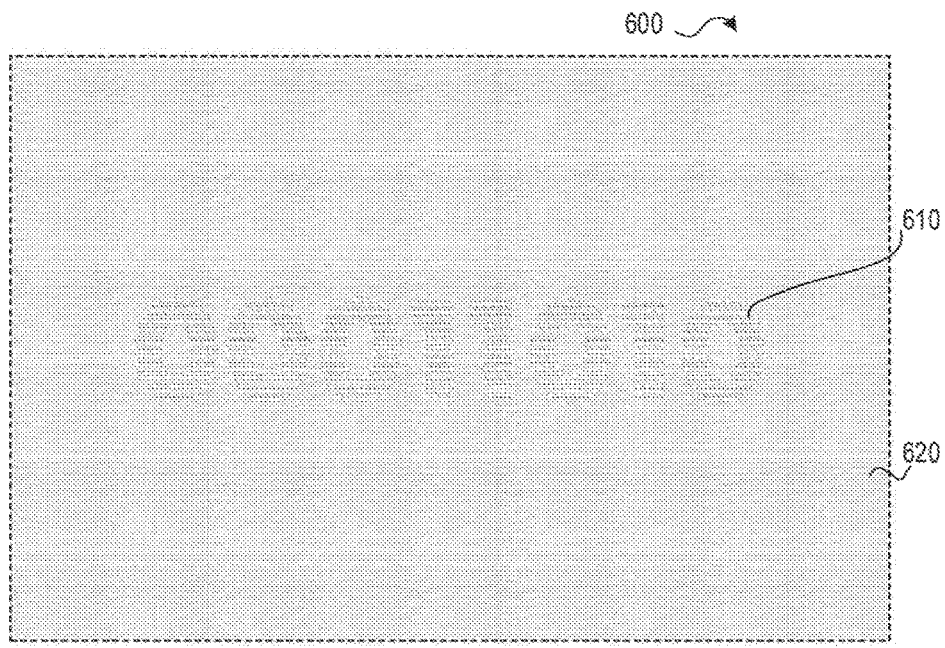
FIG. 6A is an example of a multiple payload pantograph before reproduction consistent with disclosed implementations.
Figure 6B:
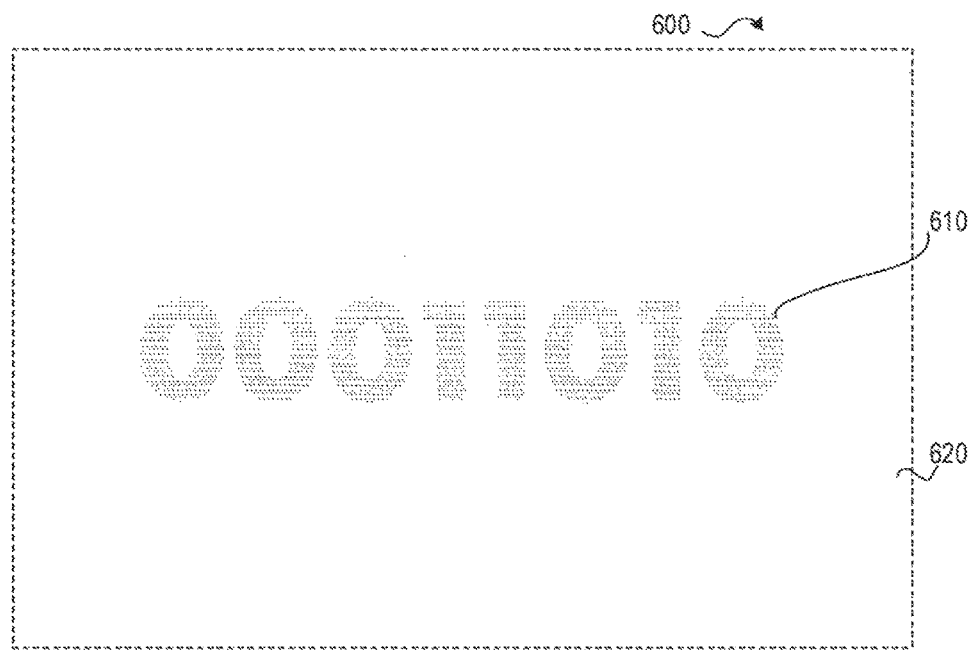
FIG. 6B is an example of the multiple payload pantograph of FIG. 6A after reproduction consistent with disclosed implementations.

FIG. 6A is an example of a multiple payload pantograph 600 before reproduction consistent with disclosed implementations and FIG. 6B is an example of the multiple payload pantograph 600 of FIG. 6A after reproduction consistent with disclosed implementations. In the example shown in FIG. 6A, multiple payload pantograph 600 includes a pantograph foreground 610 and a pantograph background 620. Pantograph foreground 610 in this example is a binary code, and includes a pattern (e.g., a first pattern) that is a data-bearing pattern encoding a first payload (i.e., data) and representing a second payload (i.e., 0's and 1's). In this example, the second payload may also be decodable. For example, as shown in FIG. 6B, after reproduction the binary code in pantograph foreground 610 may become visible (e.g., the symbols in the first data-bearing pattern of pantograph foreground 610 may become larger and the symbols of pantograph background 620 may be smaller or disappear after reproduction). A computing system may be able to use optical character recognition (OCR) to determine the now-visible binary code and may be able to decode it to reveal the data encoded by the binary code. As discussed above with respect to FIGS. 5A and 5B, while this example shows a particular pantograph foreground and background, pantograph foregrounds and backgrounds consistent with disclosed examples may include any suitable type of data-bearing pattern, be of any suitable size and/or shape, and the like. Furthermore, like in FIGS. 5A and 5B, the sets of symbol characteristics in FIGS. 6A and 6B are simplified for illustrative purposes only.

The disclosed examples may include systems, devices, computer-readable storage media, and methods for generating multiple payload pantographs. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a", "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-6B are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A system for generating multiple payload pantographs comprising:
    a first pattern generation engine to generate a first pattern, the first pattern being a data-bearing pattern encoding a first payload, wherein the first pattern generation engine comprises processor-executable instructions stored on a non-transitory machine-readable storage medium, the first pattern comprising a plurality of symbols having a set of first pattern characteristics;
    a second pattern generation engine to generate a second pattern, the second pattern, by itself or in a combination with the first pattern, representing a second payload, the second payload being camouflaged by the combination of the first pattern and the second pattern; and
    a pantograph generation engine to generate a multiple payload pantograph including the first pattern and the second pattern, the multiple payload pantograph including the first pattern in one of a pantograph background or a pantograph foreground;
    wherein reproducing the multiple payload pantograph modifies at least one of the set of first pattern characteristics such that the first payload does not survive the reproduction.

2. The system of claim 1, wherein:
    the first pattern includes a plurality of symbols having a set of first pattern characteristics;
    reproducing the multiple payload pantograph modifies at least one of the set of first pattern characteristics to reveal a coded version of the first payload; and
    the coded version of the first payload is not revealed until the multiple payload pantograph is reproduced.

3. The system of claim 2, wherein the set of first pattern characteristics includes at least one of a symbol size, a symbol position, and a symbol color.

4. The system of claim 2, wherein the first pattern is generated by positioning, sizing, and shaping the symbols to pre-compensate for modifications in the first pattern due to reproduction.

5. The system of claim 1, wherein:
    the data-bearing pattern is a first data-bearing pattern; and
    the second pattern is a second data-bearing pattern encoding a third payload.

6. The system of claim 5, wherein at least one of the first data-bearing pattern and the second data-bearing pattern comprise at least one of a grid code and a stegatone.

7. The system of claim 1, comprising a print device to print the pantograph.

8. A non-transitory computer-readable storage medium encoded with instructions that, when executed by a processor, perform a method, the method comprising:
    determining a pantograph foreground region and a pantograph background region;
    determining at least one data-bearing region, the at least one data bearing region being at least one of the pantograph foreground and the pantograph background;
    determining a first payload to encode in the at least one data-bearing region;
    based on the determination of the at least one data-bearing region, generating a pantograph foreground pattern in the pantograph foreground region and a pantograph background pattern in the pantograph background region,
        the pantograph foreground pattern including a first set of symbols sized, shaped, and positioned to represent a second payload,
        the pantograph background pattern including a second set of symbols sized, shaped, and positioned to obscured the second payload, and
        at least one of the first set of symbols and the second set of symbols including symbols further sized, shaped, and positioned to encode the first payload; and
    generating a multiple payload pantograph based on the pantograph foreground pattern and the pantograph background pattern.

9. The non-transitory computer-readable storage medium of claim 8, wherein the first set of symbols constitutes the second payload.

10. The non-transitory computer-readable storage medium of claim 8, wherein the symbols included in the first set of symbols and the second set of symbols are further sized, shaped, and positioned such that reproducing the pantograph either reveals a coded version of the first payload or destroys the first payload.

11. The computer-implemented method of claim 8, wherein the first pattern and the second pattern are a plurality of dots sized and shaped such that:
   based on a visual inspection, the second pattern is minimally distinguishable from the first pattern; and
   when the multiple payload pantograph is reproduced, a majority of the second pattern is not visible in the reproduction of the multiple payload pantograph.

12. The computer-implemented method of claim 10, wherein at least one of the pantograph foreground pattern and the pantograph background pattern is a grid code or a stegatone.

13. A computer-implemented method for generating multiple payload pantograph including first coded information and second coded information, comprising:
   accessing, via a processor, a digital version of a multiple payload pantograph, the multiple payload pantograph comprising a first pattern and a second pattern,
   the first pattern being a first data-bearing pattern encoding a first payload,
   the second pattern, when combined with the first pattern, camouflaging a second payload, wherein the second pattern is a second data-bearing pattern encoding a third payload,
   the first pattern being positioned in one of a pantograph background region and a pantograph foreground region; and
   printing the multiple payload pantograph on a print medium.

14. The method of claim 13, wherein the first data-bearing pattern and the second data-bearing pattern comprise at least one of a grid code and a stegatone.

\* \* \* \* \*

UNITED STATES PATENT AND TRADEMARK OFFICE
CERTIFICATE OF CORRECTION

PATENT NO. : 10,154,165 B2
APPLICATION NO. : 15/512038
DATED : December 11, 2018
INVENTOR(S) : Jason S Aronoff et al.

Page 1 of 1

It is certified that error appears in the above-identified patent and that said Letters Patent is hereby corrected as shown below:

On the Title Page

Item (57), ABSTRACT, Column 2, Line 1-2, delete "pantograph." and insert -- pantographs. --, therefor.

Signed and Sealed this
Twenty-third Day of April, 2019

Andrei Iancu
*Director of the United States Patent and Trademark Office*